United States Patent [19]

Thylén

[11] Patent Number: 4,457,579

[45] Date of Patent: Jul. 3, 1984

[54] ARRANGEMENT TO REDUCE INFLUENCE OF DIFFUSE AND DIRECT REFLECTIONS IN A DISPLAY DEVICE BASED ON A SOURCE OF LIGHT EMITTING IN A NARROW BAND

[75] Inventor: Lars H. Thylén, Huddinge, Sweden

[73] Assignee: Telefonaktiebolaget L M Ericsson, Stockholm, Sweden

[21] Appl. No.: 193,263

[22] PCT Filed: Aug. 14, 1979

[86] PCT No.: PCT/SE79/00172

§ 371 Date: Apr. 15, 1980

§ 102(e) Date: Mar. 20, 1980

[87] PCT Pub. No.: WO80/00499

PCT Pub. Date: Mar. 20, 1980

[30] Foreign Application Priority Data

Aug. 15, 1978 [SE] Sweden .............................. 7808662

[51] Int. Cl.³ .............................................. G02B 27/14
[52] U.S. Cl. .................................. 350/3.72; 350/174; 350/316

[58] Field of Search ................. 350/3.72, 174, 331 R, 350/334, 316, 3.7; 358/252

[56] References Cited

U.S. PATENT DOCUMENTS 3,454,715  7/1969  Larach et al. ...................... 358/252
3,679,297  7/1972  Searle et al. ........................ 350/316
3,915,548  10/1975  Oppittek et al. .................. 350/3.72

Primary Examiner—Bruce Y. Arnold
Attorney, Agent, or Firm—Roberts, Spiecens & Cohen

[57] ABSTRACT

An arrangement for reducing influence of diffuse and direct reflections in a display device based on a light source emitting in a narrow band said display device comprising an absorption filter (25) having a pass band enclosing the center frequency of the light source (11) said absorption filter being placed in the beam path between the light source (11) and the observer (14) and immediately adjacent reflecting means (24), the bandwidth of the filter (25) being wider than the bandwidth of the light source (11), but considerably narrower than the spectral bandwidth of the eye.

6 Claims, 3 Drawing Figures

ARRANGEMENT TO REDUCE INFLUENCE OF DIFFUSE AND DIRECT REFLECTIONS IN A DISPLAY DEVICE BASED ON A SOURCE OF LIGHT EMITTING IN A NARROW BAND

FIELD OF INVENTION

The present invention relates to an arrangement to reduce the influence from diffuse and direct reflections in a display device based on a source of light emitting in a narrow band where the image is regarded directly or through an optical system.

DESCRIPTION OF PRIOR ART

In fast aircrafts the pilot in certain situations cannot move the eyes from the field of view through the front window to the indicators which he must read because the aircraft during the time of reading will move too far. In order to render it possible for the pilot to read these indicators without reducing his attention to the outside view a semi-transparent mirror has been placed in the field of view through the front window. By means of this mirror symbols and indicator readings are reflected onto the field of view of the pilot so that he sees them clearly when the eye is focused on remote looking. An arrangement of this kind is usually called HUD, short for the English expression "head up display".

The symbols can for example be reflected from a cathode ray tube the display of which is projected through a lens system onto the semi-transparent mirror. As this mirror is planar the display will be in focus of the lens system. Sunlight accidentally passing the mirror towards the lens system will consequently be focused onto the display as a shining point which, however, does not essentially disturb the image.

Semi-transparent mirrors that are not wave-length selective have certain disadvantages when reflecting images onto a field of view since the transmission of incoming light and the reflection of the symbols are performed with low efficiency. Lately phase holograms have been used instead of such semi-transparent mirrors for reflecting symbols into the field of view of a pilot for example. Such arrangements are described for example in the Swedish Pat. No. 398 007 or the U.S. Pat. No. 3,915,548. Besides a high efficiency when reflecting and transmitting a hologram has the property that it also can refract the light in the same manner as lenses or spherical mirrors. In the above mentioned U.S. patent the hologram has been made in such a way that it works as a wave-length selective spherical mirror. Thus the exit pupil of the optical system will not depend on the dimensions of the lens system as in a conventional HUD-system, but it is possible to have a symbol presentation of remarkable size also when having a small dimension lens system. The lens system, the so called relay lens generates a virtual image of the symbol of the display unit in the focal plane of the spherical mirror enabling this image to be magnified as desired.

SUMMARY OF THE INVENTION

The contrast of the reflected symbol image, however, may be inferior as a diffuse reflection takes a large part of the field of view. This reflection also disturbs the transparency. In spite of the fact that the hologram performs a complicated filtering of incoming and reflected light the attenuation which is obtained is unsufficient. Sunlight can pass the hologram and fall towards the lens system which breaks the parallel sunlight towards a point in front of the display of the cathode ray tube. Consequently the display will be illuminated from this point and give a diffuse reflection which is thrown back via the lens system towards the hologram and further towards the observer who sees an unacceptable diffuse illumination of his field of view. There is a corresponding problem also in normal display units used for direct observation of a cathode ray tube where reflections are a big problem especially when they are to be used in sunlight.

According to the invention it is possible to reduce the influence of diffuse and direct reflections in a display device based on a light source emitting in a narrow band and the characteristics of the invention appear from the appended claims.

BRIEF DESCRIPTION OF THE DRAWING

The invention will be described more in detail in connection with the accompanying drawing where.

PREFERRED EMBODIMENT

Figure 1:
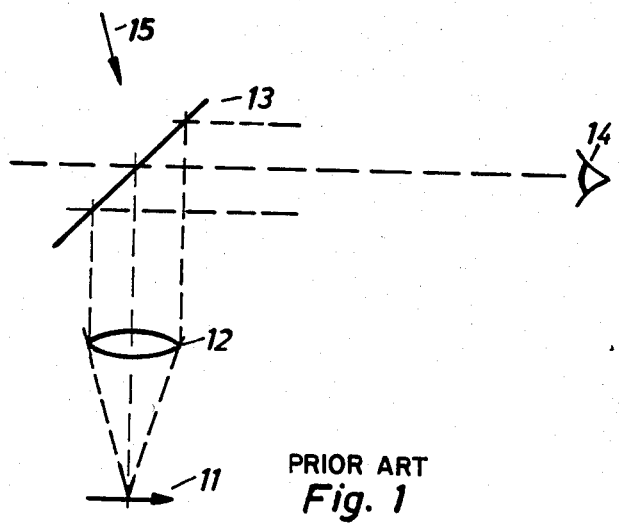
FIG. 1 shows a display device with a semi-transparent mirror according to the prior art.

In FIG. 1 reference numeral 11 designates a luminous symbol image being generated for example by a cathode ray tube. The symbol image is placed in the focal plane of a lens system 12, which collimates the emitted light. This is reflected by a planar, partially reflecting mirror 13 towards an observer's 14 eye. The observer then interprets the symbols as being placed at an infinite distance within a field of view being limited by the dimensions of the lens system. Sun rays 15, which pass through the semi-transparent mirror 13 towards the lens system 12 are refracted into one shining spot on the very symbol image. This shining spot is then reflected towards the observer who sees a shining point in the symbol image which is not disturbed otherwise.

Figure 3:
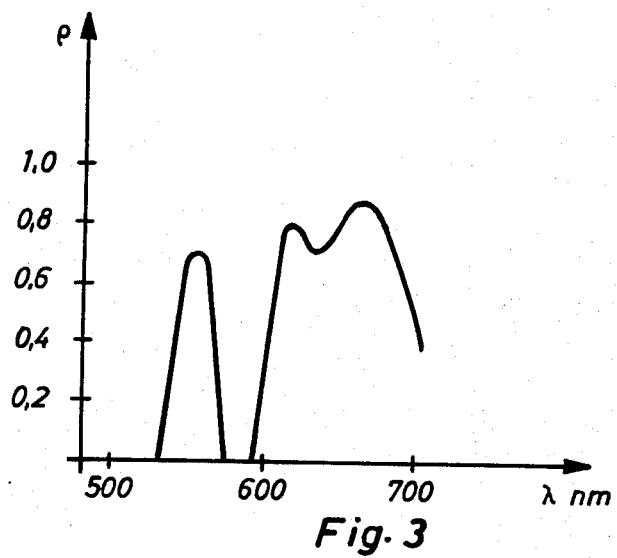
FIG. 3 shows the filter characteristics of an absorption filter being part of the arrangement according to FIG. 2.

When the partially reflecting mirror according to the U.S. Pat. No. 3,915,548 is replaced by a hologram 21, which besides acting as a partly semi-transparent mirror, also works as a concave mirror, the conditions will be different as is described in FIG. 2. The luminous symbol image 11 is reproduced magnified in a plane 23 by a lens system (relay lens) 22, which can be simpler than the lens system being part of the arrangement according to FIG. 1. The plane 23 is a focal plane for the hologram 21, where the symbol image will be reproduced. In order to reduce the dimensions of the optical system there is in this case a mirror 24 placed in the beam path. In front of the mirror 24 an absorption filter is placed with a narrow pass band having mainly the attenuation characteristics which is shown in FIG. 3.

Figure 2:
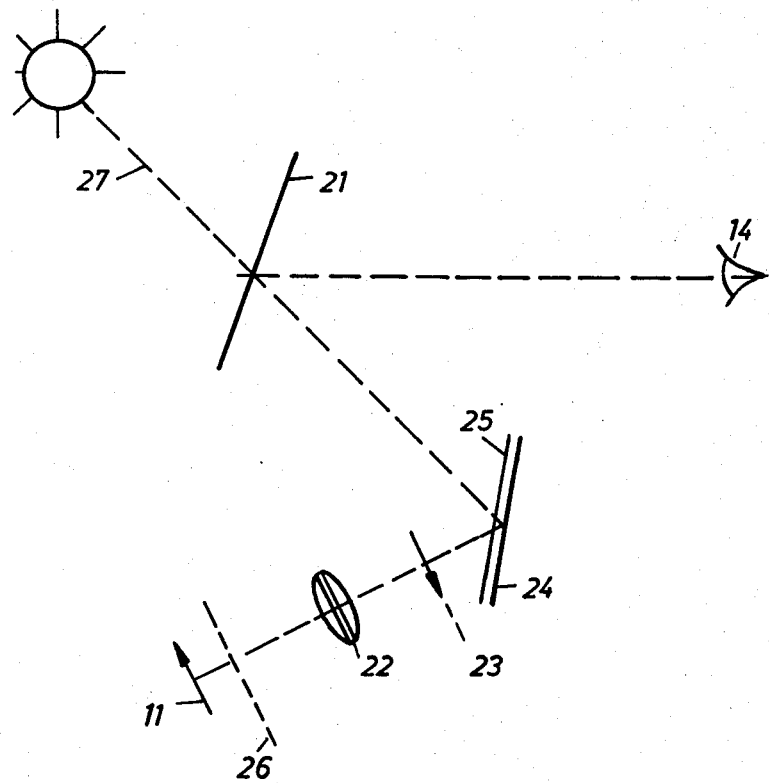
FIG. 2 shows a holographic display device according to the invention.

The symbol image in FIG. 2 is generated by a narrow band light source.

In a specific embodiment a cathode ray tube with P-43-type phosphor is used. This has a brightness maximum at $\lambda = 543$ nm and a band width of 2 nm. The hologram has a band width of about 14–18 nm around the wavelength. Within this region the hologram is working as a concave mirror with high reflectance region. Outside the region the hologram is to be considered almost as transparent so that light coming from the ouside can pass without any attenuation worth mentioning. The narrow wave-length band being rejected does hardly affect the colour of the light coming from the outside.

The hologram performs a complicated filtration of incident and reflected sunlight but the attenuation thus achieved is insufficient to prevent the sunshine from disturbing the reproduction of the image and the through-sight. Incident sunlight 27 can pass through the hologram also within the active area of the hologram and is refracted in the focal plane 26 of the lens system 22. This gives rise to a diffuse reflection from the symbol image, that is the display of the cathode ray tube. This reflection, which occupies a big part of the field of view is projected towards the observer 14. By means of the filter 25, having the characteristics shown in FIG. 3 with a half value band width of the magnitude 25 nm and a reflectance of approximately 0,7, in combination with the mirror 24 at $\lambda = 543$ nm a heavy limitation of the energy contents of the incident sunlight reflected from the display of the cathode ray tube 11 is achieved. Ideally the filter and the light source should have the same band width but due to tolerances in the position of the pass band of the filter and the phosphor material the filter pass band must be made wider. It has been proven that the reflections are attenuated a factor 4 with the shown filter of which a factor 2 relates to the band pass filtering. The big advantage of using an absorption filter instead of using an interference filter, which is normal when narrow band filters are desired, is that the abosroption filter is independent of the angle of incidence of the light. The filter used has a pass band for long wave light above 600 nm. Even if the sensitivity of the eye quickly declines for such domain the absorption filter may possibly be completed with another filter working for this part of the spectrum. This filter may be an interference filter.

Also in a presentation system for direct sight, for instance a display using a cathode ray tube as the light source, the influence of the reflections can be considerably reduced. By using a cathode ray tube display with a narrow band phosphor and by placing a filter of the type described in front of the display it is achieved that the reflections from the display screen are considerably attenuated.

What we claim is:

1. Holographic display equipment for generating an image in the field of view of an observer, comprising: a symbol source means for emitting monochromatic light of substantially a given wavelength; a holographic optical means in the field of view of an observer, said holographic optical means being arranged for generating an image by means of reflecting light of said given wavelength coming from a focal plane; a lens system means for generating an image of said symbol source means in said focal plane; reflecting means in the beam path between said symbol source means and said holographic optical means; and filter means immediately adjacent said reflecting means for decreasing the influence of diffuse reflections in the equipment, said filter means comprising an absorption band-pass filter in the beam path between said reflecting means and said holographic optical means, a pass band of the absorption filter having its center frequency substantially at the wavelength of the emitted monochromatic light and a bandwidth substantially greater than the bandwidth of said symbol source means and less than the bandwidth of reflection of said holographic optical means.

2. Holographic display equipment according to claim 1, wherein the absorption filter is in front of said reflecting means and said lens system means is between said reflecting means and said holographic optical means.

3. Holographic display equipment according to claim 1 wherein said symbol source means has a bandwidth of the order of 2 nm and the absorption filter has a bandwidth of the order of 20 nm.

4. Holographic display equipment according to claim 1, 2 or 3 wherein said reflecting means is a mirror.

5. Holographic display equipment according to claim 2 wherein said symbol source means has a bandwidth of the order of 2 nm and the absorption filter has a bandwidth of the order of 20 nm.

6. Holographic display equipment according to claim 5 wherein said reflecting means is a mirror.

* * * * *